Aug. 17, 1937.  D. M. HUNTER  2,090,258
LOADING AND UNLOADING CONVEYER
Filed Jan. 13, 1936  2 Sheets-Sheet 1
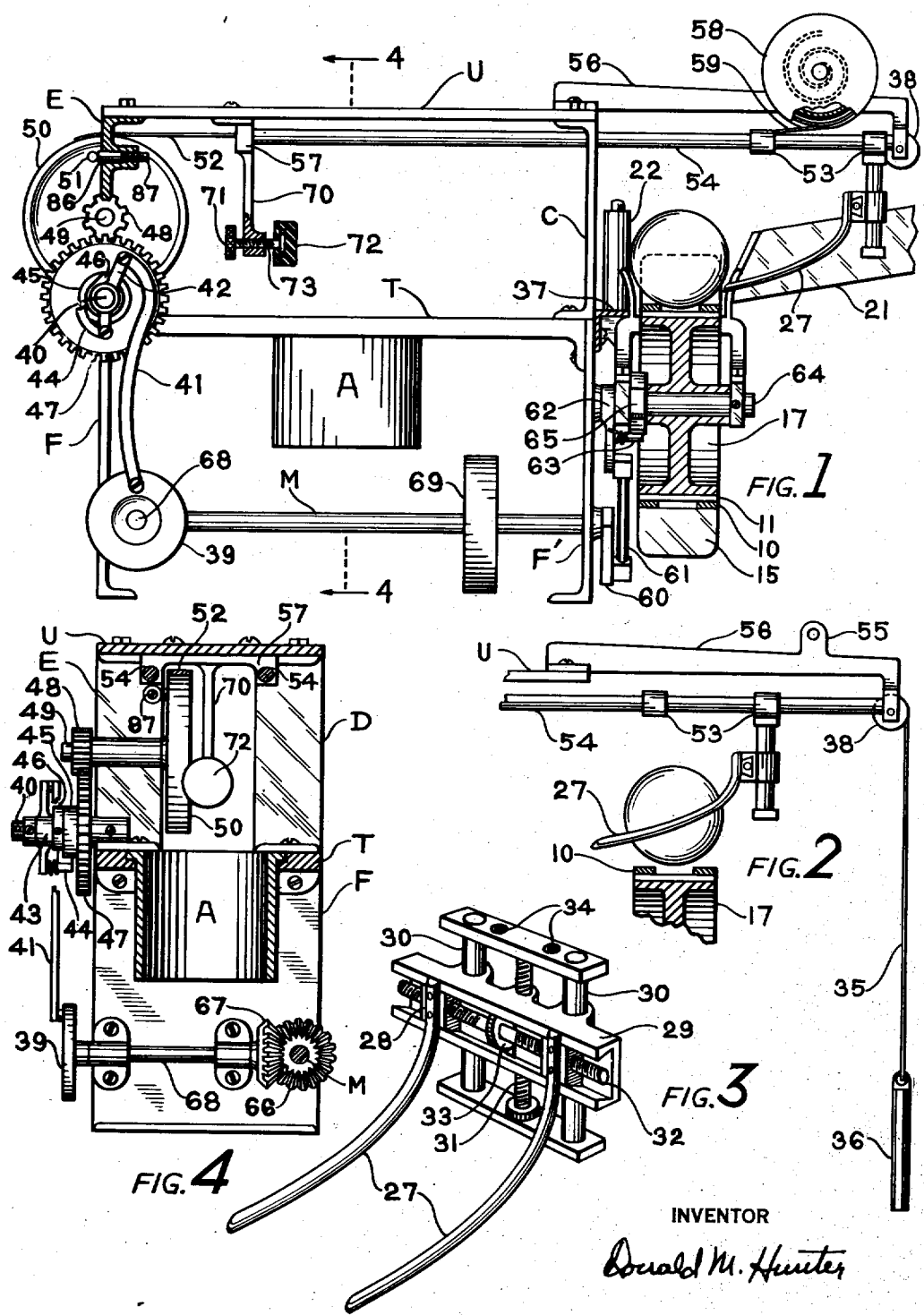
INVENTOR
Donald M. Hunter Aug. 17, 1937.    D. M. HUNTER    2,090,258
LOADING AND UNLOADING CONVEYER
Filed Jan. 13, 1936    2 Sheets-Sheet 2
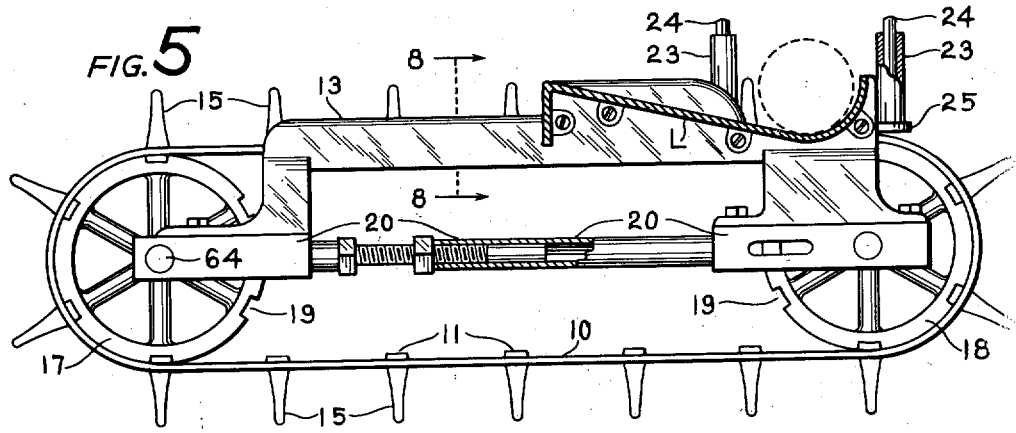
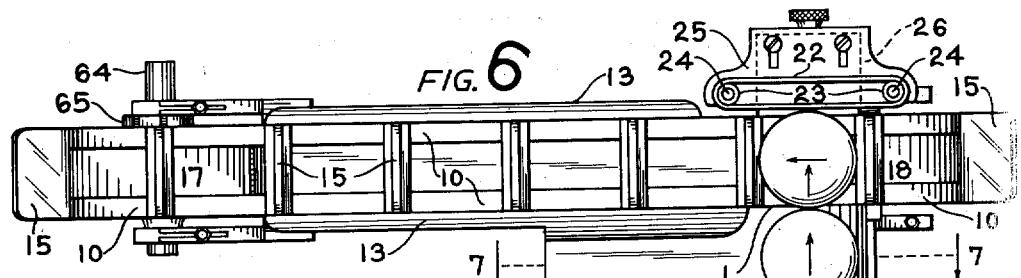
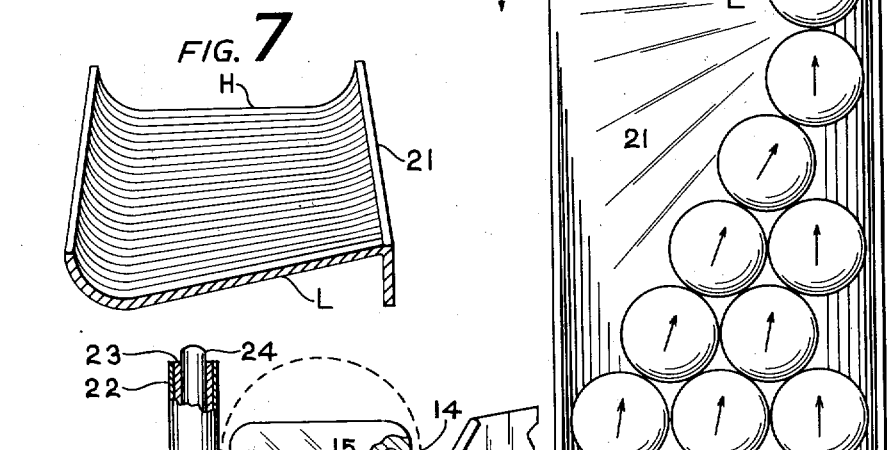
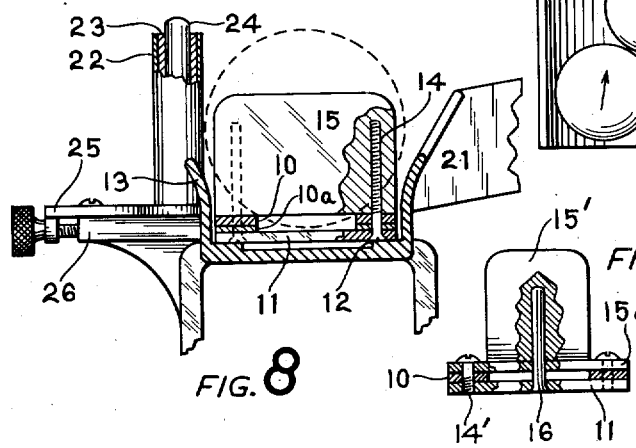
INVENTOR
Donald M. Hunter Patented Aug. 17, 1937

2,090,258

UNITED STATES PATENT OFFICE 2,090,258

LOADING AND UNLOADING CONVEYER

Donald M. Hunter, Wawawai, Wash.

Application January 13, 1936, Serial No. 58,922

12 Claims. (Cl. 198—20)

The present invention relates to an improved loading and unloading conveyer particularly adapted to individually transport globular fruits from a hopper or grader to an appointed station of a wrapping machine, and presents a continuation in part of my application Serial No. 741,769 filed Aug. 28, 1934 for a Fruit wrapping machine.

Means are provided to accommodate fruits of various sizes and the device is adapted to handle apples, oranges, or other fruits, or objects of similar shape.

The conveyer is of the continuous belt type and is provided with dividing fins spaced to provide an individual pocket for each fruit. The conveyer is periodically moved an amount equal to the spacing of the dividing fins thereon; and during each quiescent period, an individual pocket is unloaded by means of a lateral carriage operating transversely of the conveyer and adapted to lift each fruit free of the conveyer and adjacent structures and deposit it at an appointed station of a wrapping machine or other device. An individual fruit is loaded into each pocket by means of an inclined trough of improved construction and adapted to form an unorganized mass of fruit into a single column, and this loading means coacts with a baffle member adapted to center each fruit on the conveyer and to move with the fruit as it advances with the conveyer.

The loading and unloading instrumentalities are coordinated with the conveyer, and the several parts of the invention are constructed and arranged so as to obviate agitation, mauling and frictional abrasion of the fruit, which would otherwise result in injury to the fruit and consequent decay.

The disclosed construction presents one form of device particularly adapted to carry out my improved method of conveying globular objects such as easily injured fruit.

According to my improved method, the unorganized mass of globular objects are first subjected to an advance gravity flow while simultaneously subjecting them to an increasing transverse gravity flow, which may be accomplished by means of any suitable trough of either rigid or flexible construction, or by means of a sheet of flexible material conformed to the required inclinations and alterable at will. The transverse gravity flow is in one direction only and the extent thereof is limited, as for instance by the side wall of the employed trough, or by any suitable obstruction, as for instance a rail on the aforesaid sheet of flexible material. These two gravity flows are made to cause the unorganized mass of objects to align into a single column, for entrance onto any suitable conveyer. The objects are stopped at a central position on the conveyer by any suitable baffle, either rigid, traveling, or freely movable, or by hand for instance.

According to my improved method each globular object is individually removed from the conveyer by contacting the opposite sides of the object below the horizontal diameter thereof, by means of paired prongs spaced apart the proper distance and either inclined downward or else diverging towards the object, or inclination and divergence may be combined; and said paired prongs may be operated either mechanically or by hand as occasion requires. The prongs are made to contact the object as aforesaid and are moved transversely across the conveyer. To preclude the object from rolling in the direction which the prongs are moved, a minor obstruction is placed in the advance path and arranged to contact the object from below to cause it to rise upon the prongs until free of said obstruction and then travel with said prongs. The aforesaid minor obstruction may be embodied in the conveyer itself, as for instance by providing the conveyer belt with an elevated edge either continuous or at spaced intervals, or by paired belts spaced apart the proper distance, or said minor obstruction may take the form of a corrugation or rib in some structure adjacent the conveyer belt, as for instance in such structures as an apron, or in a trough, should occasion require such structures to be located in the path of the moving prongs. The prongs are moved at sufficient speed to preclude the object rolling therefrom and the object is deposited at the required position by removing the prongs in any suitable manner, such as separating the prongs to provide for the object to drop therebetween, or else by abruptly reversing the direction of movement of the prongs. The prongs may advance and return by the same path or they may be on a continuous carrier in any well known manner.

Various other modes of practicing the method will readily suggest themselves; and where the articles handled are not easily injured, appropriate modifications can be made in the construction hereinafter described, which is the best form which I have yet devised for handling delicate objects such as fruit.

The accompanying drawings illustrate the physical embodiment of my invention and it will be understood that modifications may be made in the disclosed construction, without departing from the principles of the invention and the intent of the claims.

Figure 1 is a front elevation of the invention, partly in section.

Figure 2 shows the unloading device in action.

Figure 3 is a perspective view of my improved basket for unloading the conveyer.

Figure 4 is a section taken on the line 4—4 of Figure 1.

Figure 5 is a side elevation of my improved conveyer, the loading trough being broken away.

Figure 6 is a top plan view of Figure 5 disclosing the loading trough and corelated baffle.

Figure 7 is a transverse section of the loading trough, taken on the line 7—7 in Figure 6.

Figure 8 is a transverse section of the conveyer, taken on the line 8—8 in Figure 5.

Figure 9 shows a modified dividing fin attached to paired belts.

For the convenience of illustration I have shown the invention associated with a wrapping machine having a wrapping station A, to which appointed location the fruit is individually delivered. The wrapping station A may be of any suitable form and the wrapping operation may be accomplished in any suitable manner, such details being no part of the present invention.

The invention may be installed in various forms of wrapping machines and operated from their drive means in coordination with the wrapping operation. Various other employments will readily suggest themselves.

In the present instance I have shown side frames F and F' connected by a rigid table T carrying the wrapping station A. A top plate U is supported by brackets C, D and E. The top plate U provides support for the unloading device and the bracket E carries the mechanism for operating the unloading device, this mechanism being driven from a shaft 68 geared to the main shaft M journaled in the side frames F and F'. The conveyer operates on a dead spindle carried by the side frame F' and is operated by a ratchet actuated by a crank on the main shaft M which may be turned in any suitable manner, a pulley 69 being shown in the present instance.

The conveyer may comprise a single belt having a number of equally spaced dividers thereon, said belt being trained around pulleys in the conventional manner and provided with suitable means to assure uniform movement as required. Preferably, I employ a pair of parallel belts 10 spaced by means of transverse cleats 11, which slide upon paired runners 12 each fashioned as an offset ledge in the conveyer trough which may be provided with low side walls 13, preferably outwardly flared, all as illustrated in Figure 8. The parallel belts 10 are spaced at sufficient distance apart to assure that the fruit will normally assume a central position on the conveyer and the side walls are sufficiently spaced to preclude contact with the moving fruit and the abrasion attendant thereto. The side walls 13 serve to prevent incidental escape of the fruit, but primarily they are intended to add sturdiness to said supporting runners, as the fruit will normally position itself in the void between the paired belts 10.

As shown in Figure 8, each cleat 11, may be secured to each of the parallel belts by means of a suitable bolt 14 which passes through the cleat 11 and the belt 10 and is then threaded into the dividing fin 15; or, a stepped stud may pass through a stepped bore in the dividing fin, then through the belt and then threaded into the cleat; or, as is illustrated in Figure 9, each dividing fin 15' may be provided with a projecting base 15a, in which case each bolt 14' will pass through said base and one of said belts and be threaded into the cleat 11, and a post 16 may be secured to the cleat 11, or if the dividing fin is sufficiently rigid, said post may be omitted. From these descriptions it will be readily apparent that either the cleat, or the dividing fin may with facility be removed or replaced without dismantling the conveyer.

The dividing fins are preferably of firm rubber and are flared at the base sufficiently to assure normal position relative to the parallel belts. These dividing fins need not be higher than the radius of the largest fruit and are equally spaced to admit the largest fruit intended to be handled. Thus with properly spaced short dividing fins and low side walls, two small fruits will not ride in a single pocket as would otherwise occur with deep oversize pockets, which would of course interfere with proper operation.

The described conveyer belt is trained about two pulleys 17 and 18, each of which are provided with transverse grooves 19 on the contacting face. The grooves 19 are complementary to the aforementioned cleats 11 and are spaced similar thereto, thereby assuring positive traction and consequently, uniform movement of the conveyer. The pulley 17 turns upon the dead spindle 64 rigid with the frame plate F' and the pulley 18 is provided with appropriate bearings which may be attached to any suitable support, such as a bracket applied to a grader or to a feeder bin, or supported by a pedestal upon the floor. Preferably, the said pulleys are spaced by a frame work 20 which also supports the aforementioned runners and trough, suitable means being provided for adjusting the tension of the conveyer belts.

The conveyer may be of any length required to transport the fruit to the wrapping machine, or it may be used for the sole purpose of singly positioning the fruit to be received by the lateral carriage which unloads the conveyer and delivers the fruit to the wrapping station. In the latter case, both of the aforementioned pulleys may be pivoted on the frame of the wrapping machine, and the conveyer trough secured to the frame thereof by a suitable bracket. Where the conveyer is of considerable length and the paired belts 10 necessarily rather narrow, these belts may be reinforced by paired bands of flexible metal, as shown at 10a in Figure 8. That is to say, each belt of the pair, embodies a nonmetallic band overlying a metallic band. This construction affords a light weight sturdy belt, free from appreciable stretching and adapted to carry considerable load, as is of course inherent to a conveyer of extreme length.

Proper loading of the conveyer is essential to constant operation and preferably the loading means should require a minimum of attention. As shown in Figure 6, my improved loading trough 21 is designed to produce an increasing transverse movement of the fruit as it nears the conveyer, whereby the fruit is disposed in single column by the time it reaches the conveyer, which effectively precludes blocking and clogging of the fruit, which would otherwise interfere with constant loading of the conveyer. The loading trough 21 is transversely level at the entrance end H and is transversely inclined at the conveyer end L, as is best seen in Figure 7. The loading trough as a whole is longitudinally inclined downwards towards the conveyer, sufficiently to produce the required movement of the fruit to the conveyer.

The loading trough is of a width equal to at least more than twice the diameter of the fruit, preferably twice, and is adapted to be fitted into a complementary exit in any suitable hopper or bin of appropriate capacity, which latter member is of course inclined towards its exit opening.

The fruit enters the loading trough, say in three columns; and when a single fruit leaves the loading trough to enter the conveyer, as will normally occur from the longitudinal inclination of the loading trough, the fruit will feed down, and due to the increasing transverse inclination of the loading trough, the fruit will normally move towards the conveyer in the manner indicated by the directional arrows in Figure 6. The trough is preferably of sufficient length to assure two or three fruits in single column at all times. The loading trough is illustrated with curved surfaces and it will be understood that plane surfaces may also be employed.

This improved construction is far more satisfactory and practical than a loading trough having converging side walls, which latter construction requires means or attention to repeatedly dislodge the fruit which frequently clogs at the point where the trough becomes of less width than two fruits. My improved construction is also preferable to various forms of mechanical feeding means, which are likely to maul and injure the fruit.

As best seen in Figure 6, when the fruit enters the conveyer, it contacts a baffle 22 which is fashioned as an endless belt upon rollers comprising tubes 23 rotatable upon vertical shafts 24 which are rigid with a base 25, which latter member is horizontally adjustable upon a bracket 26 as will be readily apparent from Figures 6 and 8. Plainly, by adjusting the position of the baffle 22, the fruit can be stopped at the proper position relative to the conveyer, and it will also be apparent that when the conveyer moves in the required manner, that the baffle belt 22 will move with the fruit, thereby avoiding frictional abrasion; and as previously described, the fruit is centrally positioned between the paired belts 10 and will travel with the conveyer, free of contact with the side walls 13 thereof.

The conveyer is unloaded by means of a lateral carriage provided with an improved basket which effectively lifts the fruit free of adjacent structures during its lateral movement, to thereby avoid the abrasion otherwise due to friction when the fruit is pushed along a contacting surface.

Figure 3 illustrates the preferred structure of my improved basket. A pair of prongs 27 are preferably inclined upwards away from the fruit; or, they may diverge towards the fruit; or, I may employ inclination and divergence combined. Preferably, said inclination is accomplished by parabolical curvature of the paired prongs, which are spaced to contact the opposite sides of the fruit below the horizontal diameter thereof, and the prongs are of sufficient width and of appropriate shape to avoid sharp contact with the fruit.

To accommodate various sizes of fruit, the prongs may be adjustably mounted as illustrated in Figure 3. In this figure each prong 27 is rigid with a block 28 slidable in the horizontal guide 29, which guide is vertically adjustable on the posts 30. The vertical adjustment may be accomplished by means of a suitable screw 31 and the horizontal spacing of the prongs 27 may be accomplished by means of the member 32 which is provided with oppositely threaded ends and a central disc 33 engaging in a complementary groove in the horizontal guide 29, whereby relative position of the prongs 27 and the horizontal guide is properly maintained in the various positions of adjustment. In the case of smaller fruit which may not be centrally positioned with relation to the lateral carriage, it will be readily understood that the fruit will assume a central position upon contacting a single prong 27, and of course the prongs should be equally spaced from the center of the carriage to assure proper positioning of the fruit relative to the delivery station A. Suitable bolt holes 34 are provided for securing the basket to the lateral carriage in the manner illustrated in Figure 1.

The lateral carriage comprises suitable guides 53 connected by a web in the conventional manner. This carriage is slidable upon the paired rods 54, which are of appropriate length to accommodate the required movement of the carriage. These rods are rigidly supported by the overhead bracket arm 56 and by the bracket 57 secured to the top plate U. A spur 55 on the overhead bracket arm, carries a spring actuated winding reel 58, upon which is wound a suitable length of flat cable 59, the free end of which is secured to the lateral carriage 53.

As seen in Figure 1, the shaft M carries a crank 60 to which is pivoted a link 61, the opposite end of which is pivoted to a collar 62, carrying a ratchet pawl 63 provided with a suitable spring. The collar 62 turns fractionally on the spindle 64 which is rigid with the frame F'. The ratchet pawl 63 engages a ratchet wheel 65 rigid with the conveyer pulley 17 which turns on the spindle 64, and the ratchet is adapted to move the conveyer exactly one pocket at each revolution of the main shaft M, which may be turned in any suitable manner, in the present instance a pulley 69 being shown.

As shown in Figure 4, the main shaft M also carries a miter gear 66 which meshes with a like gear 67 on a shaft 68 suitably journaled in bearing brackets supported by the side frame F. The shaft 68 carries the wheel 39, to which is pivoted a link 41, the opposite end of which is pivoted to an arm 42 on a collar 43 carrying a ratchet pawl 44 which engages a single notch ratchet wheel 45 rigid with a gear 47 meshing with a pinion 48 rigid with a shaft 49, with which turns the winding drum 50 also rigid with the shaft 49. The ratchet pawl 44 is held in contact with the ratchet wheel 45 by a suitable spring and tripped by means of a cam 46 rigid on the shaft 40, the critical moment of release being regulated by the relative position of the cam 46. For convenience of adjustment, the end of the shaft 40 may be provided with a transverse bore, into which any suitable tool may be inserted for convenience in turning the shaft 40 and the cam 46 rigid therewith; after which, the shaft may be held rigid by a suitable set-screw. The cam 46 is adjacent to the ratchet wheel 45, and the pawl 44 overlies the ratchet wheel and the cam. The minimum dimension of the cam is clear of the notch in the ratchet wheel and the maximum dimension of the cam extends to the face of the ratchet wheel to thereby lift the pawl free of the notch.

Secured to the winding drum 50 is a flat cable 52, preferably of flexible metal or fabric. The opposite end of this cable is secured to the lateral carriage 53, and it will be readily understood that the action of the parts described in the preceding paragraph, will wind the cable 52 upon the drum 50, thereby imparting the required movement to the lateral carriage. It will be plain that the advance movement of the carriage 53 will unwind the cable 59 from the reel 58 with the consequent winding of the spring thereof, and that this reel will return the carriage to initial position when the opposite force is released in the previously described manner.

For emergency use, a grooved pulley 38 may be provided. When required for emergency, any convenient cable 35 may be secured to the lateral carriage 53 and said cable trained over the emergency pulley 38 and the end of said cable weighted in any convenient manner, to temporarily serve the purpose of the reel, in the manner shown in Figure 2.

The return movement of the carriage is limited and the excess rotation of the drum 50 precluded, by means of a stop comprising a bump post 86 urged by a screw 87 threaded into a bore in a suitable boss carried by the bracket E. The post 86 is preferably rawhide and adapted to impinge a lug or stud 51 carried by the drum 50. The drum 50 is of sufficient diameter that less than one rotation will move the carriage the required amount, and the extent of this rotation is limited by the position of the cam 46, and the reverse rotation is limited by the stop just described, thus confining the movements of the drum to a predetermined arc.

As seen in Figure 1, the fruit is disposed in the void between the paired belts 10 of the conveyer and obviously no lateral movement of the fruit will occur until the fruit is lifted free of the conveyer. It will be readily understood that when the previously described prongs contact the opposite sides of the fruit, below the horizontal diameter thereof, that the advance movement of the prongs will primarily cause the fruit to ascend the inclination of said prongs until the fruit is free of the conveyer, as is illustrated in Figure 2, whereupon the fruit will then move with the prongs as the carriage moves to required position.

The carriage with the fruit upon the prongs, moves at sufficient rate to preclude the fruit rolling from the prongs, and it will be readily understood that when the advance of the carriage ceases and the reverse movement is immediately effected by the reel 58, that the fruit will of course leave the prongs as required. The fruit is effectively lifted free of adjacent structures and dropped at the appointed location, unaccompanied by rolling. For the purpose of wrapping, the fruit is of course dropped upon a wrapper superimposed above the wrapping station A and such wrapper provides a suitable cushion for the fruit to alight upon, and of course the fruit need not be dropped more than one or two inches. Obviously this improved arrangement reduces bruising and abrasion of the fruit to a minimum. The apron 37 bridges the gap between the conveyer and the wrapping machine and is here shown as a simple projection, but may take the form of a trough leading to the wrapping station A.

When operated at the speed usually required, the prongs 27 discharge the fruit at the appointed station practically free of bounding. For operation at higher speeds, I may provide a buffer 72, preferably of sponge rubber. This buffer is carried by an adjusting screw 73 threaded into an arm 70 depending from the bracket 57, and a suitable hand wheel 71 is provided for the purpose of adjustment.

In the operation of the device, the shaft M turns constantly, and alternately operates the conveyer and the lateral carriage periodically. In Figure 1, the crank 60 is shown at the completion of the stroke actuating the ratchet 65 to align one of the pockets of the conveyer with the lateral carriage. The link 41 is shown at the beginning of the stroke required to advance the lateral carriage, and it should be mentioned that less than one half of the rotation of the wheel 39 is utilized for producing the required advancement of the carriage, so as to leave a suitable interval for the carriage to be returned to initial position before the succeeding movement of the conveyer, as is of course necessary for successful operation.

The screw 87 is turned to hold the carriage clear of impact with the bracket 56, the loading device is supplied with globular objects and the shaft M set in operation. It will be clear that the objects will feed into each empty pocket as it arrives at the loading position, and that the baffle 22 can be adjusted to center the objects between the paired belts. As each pocket of the conveyer arrives at the unloading position, the carriage will advance transversely across the then stationary conveyer, and the prongs 27 being properly spaced apart and suitably spaced above the conveyer, they will contact the opposite sides of the globular object carried between the dividing fins; and the belt which lies transverse of the advance path of the carriage, will temporarily impede the advance of said object and cause it to rise upon the prongs and be lifted free of obstruction, whereupon the object will then move forward with the prongs until the advance movement is interrupted by the cam 46 disengaging the pawl 44; whereupon, the reverse movement of the carriage will deposit the article at its advanced position, the critical moment of discharge being controlled by the relative position of the cam 46. Should occasion require, the buffer 72 may be utilized to preclude excess advance of the object after discharge, but of course this buffer should not contact the object until after the latter has been discharged from the prongs, as such premature impact is entirely unnecessary and highly objectionable.

When the proper adjustments have been made to accommodate a particular size of object, the conveyer will load and unload continuously, with accurate delivery to an appointed station. The usual variation in a particular size of graded fruit will not appreciably affect the operation of the device, and it is of course understood that suitable adjustments are to be made when changing to a different grade of fruit, the disclosed instrumentalities being fully sufficient to cover the usual range of the several grades of a particular kind of fruit.

It will be seen that the device not only has a wide amplitude for various sized globular objects, but that it is particularly adapted to handle delicate objects which are likely to be otherwise injured by agitation, mauling and abrasion.

In the invention herein disclosed, what I claim as new and desire to secure by Letters Patent of the United States is:

1. A loading and unloading conveyer comprising a series of spaced dividers carried by parallel belts, a trough laterally positioned at one end of said conveyer, said trough longitudinally inclined downwards towards said conveyer, said trough transversely inclined at the conveyer end and transversely level at its other end, a traveling baffle disposed parallel with said conveyer and opposite said trough, a carriage operatable transversely across the other end of said conveyer, spaced prongs carried by said carriage and inclining downward therefrom, means for periodically actuating said conveyer a single division at a time, and means for periodically advancing and returning said carriage during the quiescent period of said conveyer.

2. A loading and unloading conveyer comprising spaced dividers carried by a pair of parallel belts spaced apart to support a globular object centrally therebetween, means for loading an individual globular object between said dividers, means for periodically actuating said conveyer a single division at a time, means operatable transversely across said conveyer and coacting with one of said belts to lift a globular object free of said conveyer, and means for advancing and returning the last said means during the quiescent period of said conveyer.

3. A loading and unloading conveyer comprising an endless belt carrying spaced dividers forming pockets, means for loading an individual globular object into each of said pockets, means for periodically operating said conveyer a single pocket at a time, a carriage operatable transversely across said conveyer, paired prongs inclined downward from said carriage and spaced apart to contact the opposite sides of a globular object below the horizontal diameter thereof, means for advancing and returning said carriage during the quiescent period of said conveyer, and a minor obstruction disposed in the path of the object carried by said prongs and adapted to cause such object to ascend the inclination of said prongs until free of said obstruction.

4. A loading and unloading conveyer comprising an endless belt carrying spaced dividers forming pockets, means for loading an individual globular object into each of said pockets, means for periodically operating said conveyer a single pocket at a time, a carriage operatable transversely across said conveyer, paired prongs inclined downward from said carriage and spaced apart to contact the opposite sides of a globular object below the horizontal diameter thereof, means for advancing and returning said carriage during the quiescent period of said conveyer, a minor obstruction disposed in the path of the object carried by said prongs and adapted to cause such object to ascend the inclination of said prongs until free of said obstruction, and a buffer disposed at the end of the path of travel.

5. In a loading and unloading conveyer having pockets thereon adapted to carry globular objects individually, a lateral carriage unit adapted to individually lift such objects free of the conveyer, means to advance said carriage across said conveyer and to return said carriage to initial position, means for altering the critical point of reverse movement of said carriage, means for alternately and periodically operating said conveyer and carriage in coordinated cross movements, and means for loading the conveyer.

6. In a loading and unloading conveyer having a number of pockets each adapted to retain a globular object, means for loading said conveyer, means for excluding a plurality of objects from each individual pocket, a lateral carriage movable transversely across said conveyer and adapted to individually unload each of said pockets, means to advance said carriage across said conveyer and to return said carriage to initial position, means for altering the critical point of reverse movement of said carriage, and means for alternately and periodically operating said conveyer and carriage in coordinated movements.

7. In a loading and unloading conveyer having means for spacing individual globular objects thereon, a carriage operatable transversely across said conveyer, paired prongs inclined downward from said carriage and spaced apart to contact the opposite sides of one of said objects below the horizontal diameter thereof, means for periodically operating said conveyer to position one of said objects in the advance path of said prongs, a minor obstruction disposed in said advance path and adapted to impede the advance of said object to cause the object to ascend the inclination of said prongs until free of said obstruction, means to advance and return said carriage in the interval between the periodic movements of said conveyer.

8. A loading and unloading conveyer comprising means for spacing individual globular objects thereon, a carriage movable transversely across said conveyer and carrying a basket adapted to individually remove globular objects from said conveyer, a winding drum in advance of said carriage, a cable connecting said carriage and winding drum, drive means for periodically turning said winding drum to thereby advance said carriage, means for disengaging said drive means, means for retracting said carriage to initial position, means for limiting the reverse rotation of said drum, means for periodically actuating said conveyer an amount equal to the spacing of the objects thereon during the stationary period of said carriage, and means for loading globular objects individually onto said conveyer.

9. A loading and unloading conveyer comprising a pair of spaced pulleys having equally spaced transverse grooves on the face thereof, paired belts trained around said pulleys, said belts spaced apart and connected by cleats spaced corresponding to the grooves in said pulleys, a track adapted to support the top flight of cleated belts, dividing fins transverse of said belts and equally spaced apart, the width and the height of each of said dividing fins being less than the spacing between said fins, means for periodically turning said pulleys fractionally an amount equal to the spacing of said dividing fins, means for successively loading globular objects individually into the spaces between said dividing fins, means for individually unloading said conveyer, and means for periodically actuating said unloading means during the interval between the periodic movements of said conveyer.

10. A loading and unloading conveyer comprising, a traveling belt having spaced dividers thereon, a laterally arranged trough positioned at one end of said conveyer, said trough longitudinally inclined downwards towards said conveyer, said trough transversely inclined at its conveyer end and transversely level at its other end the transverse inclination of said trough being gradually progressive from the level end to the conveyer end thereby to gradually form an unorganized mass of globular objects into a single column, means for actuating said conveyer, and means for unloading said conveyer.

11. In a loading and unloading conveyer laterally fed by gravity, a baffle disposed opposite said gravity feed, said baffle comprising an endless belt trained around upstanding rollers, said belt adapted to serve as a stop for an object entering the conveyer by said gravity feed and adapted to move with said conveyer and object until the latter is free of said baffle, means for actuating said conveyer, and means for unloading said conveyer.

12. In a loading and unloading conveyer having means for spacing individual globular objects thereon, a carriage operatable transversely across said conveyer, paired prongs inclined downward from said carriage and spaced apart to contact the opposite sides of one of said objects below the horizontal diameter thereof, means for operating said conveyer to position each of said objects individually in the advance path of said prongs, means to actuate said carriage in coordination with said conveyer, a minor obstruction disposed in said advance path and adapted to impede the advance of said object to cause the object to ascend the inclination of said prongs until free of said obstruction.

DONALD M. HUNTER.

CERTIFICATE OF CORRECTION.

Patent No. 2,090,258.     August 17, 1937.

DONALD M. HUNTER.

It is hereby certified that error appears in the printed specification of the above numbered patent requiring correction as follows: Page 3, first column, line 5, for the words "preferably twice" read preferably thrice; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.

means for actuating said conveyer, and means for unloading said conveyer.

11. In a loading and unloading conveyer laterally fed by gravity, a baffle disposed opposite said gravity feed, said baffle comprising an endless belt trained around upstanding rollers, said belt adapted to serve as a stop for an object entering the conveyer by said gravity feed and adapted to move with said conveyer and object until the latter is free of said baffle, means for actuating said conveyer, and means for unloading said conveyer.

12. In a loading and unloading conveyer having means for spacing individual globular objects thereon, a carriage operatable transversely across said conveyer, paired prongs inclined downward from said carriage and spaced apart to contact the opposite sides of one of said objects below the horizontal diameter thereof, means for operating said conveyer to position each of said objects individually in the advance path of said prongs, means to actuate said carriage in coordination with said conveyer, a minor obstruction disposed in said advance path and adapted to impede the advance of said object to cause the object to ascend the inclination of said prongs until free of said obstruction.

DONALD M. HUNTER.

CERTIFICATE OF CORRECTION.

Patent No. 2,090,258.  August 17, 1937.

DONALD M. HUNTER.

It is hereby certified that error appears in the printed specification of the above numbered patent requiring correction as follows: Page 3, first column, line 5, for the words "preferably twice" read preferably thrice; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.

CERTIFICATE OF CORRECTION.

Patent No. 2,090,258.  August 17, 1937.

DONALD M. HUNTER.

It is hereby certified that error appears in the printed specification of the above numbered patent requiring correction as follows: Page 3, first column, line 5, for the words "preferably twice" read preferably thrice; and that the said Letters Patent should be read with this correction therein that the same may conform to the record of the case in the Patent Office.

Signed and sealed this 26th day of October, A. D. 1937.

(Seal)

Henry Van Arsdale,
Acting Commissioner of Patents.